(12) United States Patent
Watanabe et al.

(10) Patent No.: US 8,082,012 B2
(45) Date of Patent: Dec. 20, 2011

(54) SEMICONDUCTOR INTEGRATED CIRCUIT DEVICE, AND NON-CONTACT TYPE IC CARD AND PORTABLE INFORMATION TERMINAL USING THE SEMICONDUCTOR INTEGRATED CIRCUIT DEVICE

(75) Inventors: Kazuki Watanabe, Hino (JP); Kazuhiro Matsushita, Kodaira (JP); Masaru Kubota, Hino (JP)

(73) Assignee: Renesas Electronics Corporation, Kanagawa (JP)

( * ) Notice: Subject to any disclaimer, the term of this patent is extended or adjusted under 35 U.S.C. 154(b) by 444 days.

(21) Appl. No.: 12/396,825

(22) Filed: Mar. 3, 2009

(65) Prior Publication Data

US 2009/0160652 A1    Jun. 25, 2009

Related U.S. Application Data

(62) Division of application No. 10/583,716, filed as application No. PCT/JP2004/000955 on Jan. 30, 2004, now Pat. No. 7,505,794.

(51) Int. Cl.
*H04B 1/38*    (2006.01)
*H04M 1/00*    (2006.01)
(52) U.S. Cl. ............... 455/572; 455/343.1; 455/127.1
(58) Field of Classification Search .............. 455/572, 455/343.1, 571, 573, 574, 333, 343.2, 343.5, 455/343.6, 550.1, 575.1, 90.3, 127.1, 127.5, 455/128, 129; 323/268–273
See application file for complete search history.

(56) References Cited

U.S. PATENT DOCUMENTS

| 6,831,378 | B2 | 12/2004 | Watanabe et al. |
| 6,970,690 | B2 | 11/2005 | Yajima et al. |
| 7,296,742 | B2 * | 11/2007 | Enomoto et al. ............... 235/451 |
| 7,812,580 | B2 * | 10/2010 | Watanabe et al. ............. 323/268 |
| 7,907,899 | B1 * | 3/2011 | Oliver ........................ 455/41.2 |
| 7,995,965 | B2 * | 8/2011 | Wuidart ....................... 455/41.1 |
| 2003/0083037 | A1 * | 5/2003 | Yajima et al. ................. 455/343 |
| 2005/0159117 | A1 * | 7/2005 | Bausov et al. ............ 455/127.1 |
| 2006/0199563 | A1 | 9/2006 | Kelly et al. |
| 2006/0281405 | A1 | 12/2006 | Villard et al. |
| 2007/0178857 | A1 | 8/2007 | Greene et al. |

FOREIGN PATENT DOCUMENTS

| JP | 2000-348152 | 12/2000 |
| JP | 2001-274339 | 10/2001 |
| JP | 2002-141824 | 5/2002 |
| JP | 2002-222399 | 8/2002 |
| JP | 2003-044151 | 2/2003 |

\* cited by examiner

*Primary Examiner* — Pablo N Tran
(74) *Attorney, Agent, or Firm* — Antonelli, Terry, Stout & Kraus, LLP.

(57) ABSTRACT

The present invention provides a semiconductor integrated circuit device and a non-contact type IC card and a portable information terminal which uses the semiconductor integrated circuit device. The semiconductor integrated circuit device includes antenna terminals LA, LB which are connected to an antenna L1, a power source circuit B5 which has a rectifier/smoothing circuit B1 which obtains a DC voltage by rectifying and smoothing an AC signal which is supplied to the antenna terminal from the antenna and a shunt regulator B6 and a series regulator B7 which stabilize the DC voltage, and an internal circuit B8 which is operated upon the supply of the DC voltage from the power source circuit. The series regulator operates and the shunt regulator stops in a stage that a signal is transmitted to a reader/writer. The shunt regulator operates and the series regulator stops in a stage other than the stage that the signal is transmitted to the reader/writer.

2 Claims, 13 Drawing Sheets

SEMICONDUCTOR INTEGRATED CIRCUIT DEVICE, AND NON-CONTACT TYPE IC CARD AND PORTABLE INFORMATION TERMINAL USING THE SEMICONDUCTOR INTEGRATED CIRCUIT DEVICE

CROSS-REFERENCE TO RELATED APPLICATIONS

This application is a divisional application of U.S. application Ser. No. 10/583,716, filed Jun. 20, 2006 now U.S. Pat. No. 7,505,794; and which application is a §371 of PCT Application PCT/JP04/00955, filed Jan. 30, 2004, the entire contents of which are incorporated herein by reference.

TECHNICAL FIELD

The present invention relates to a power source circuit technique which is preferably applicable to a semiconductor integrated circuit device, and more particularly to a semiconductor integrated circuit device which generates a power source upon receiving electromagnetic waves, and a non-contact IC card and a portable information terminal using the semiconductor integrated circuit device.

BACKGROUND ART

A non-contact type IC card and an IC tag which generate a power source and are operated upon receiving electromagnetic waves by an antenna without having a power source such as a battery have been popularly used in a field of transportation, finance or the like. The non-contact type IC card receives data which is transmitted by modifying electromagnetic waves from a reader/writer (interrogator) and, thereafter, further modifies the received electromagnetic waves and transmits the modified data to the reader/writer (interrogator) (for example, see Japanese Patent Laid-open No. 2001-274339 and Japanese Patent Laid-open No. 2000-348152).

DISCLOSURE OF THE INVENTION

Figure 1:
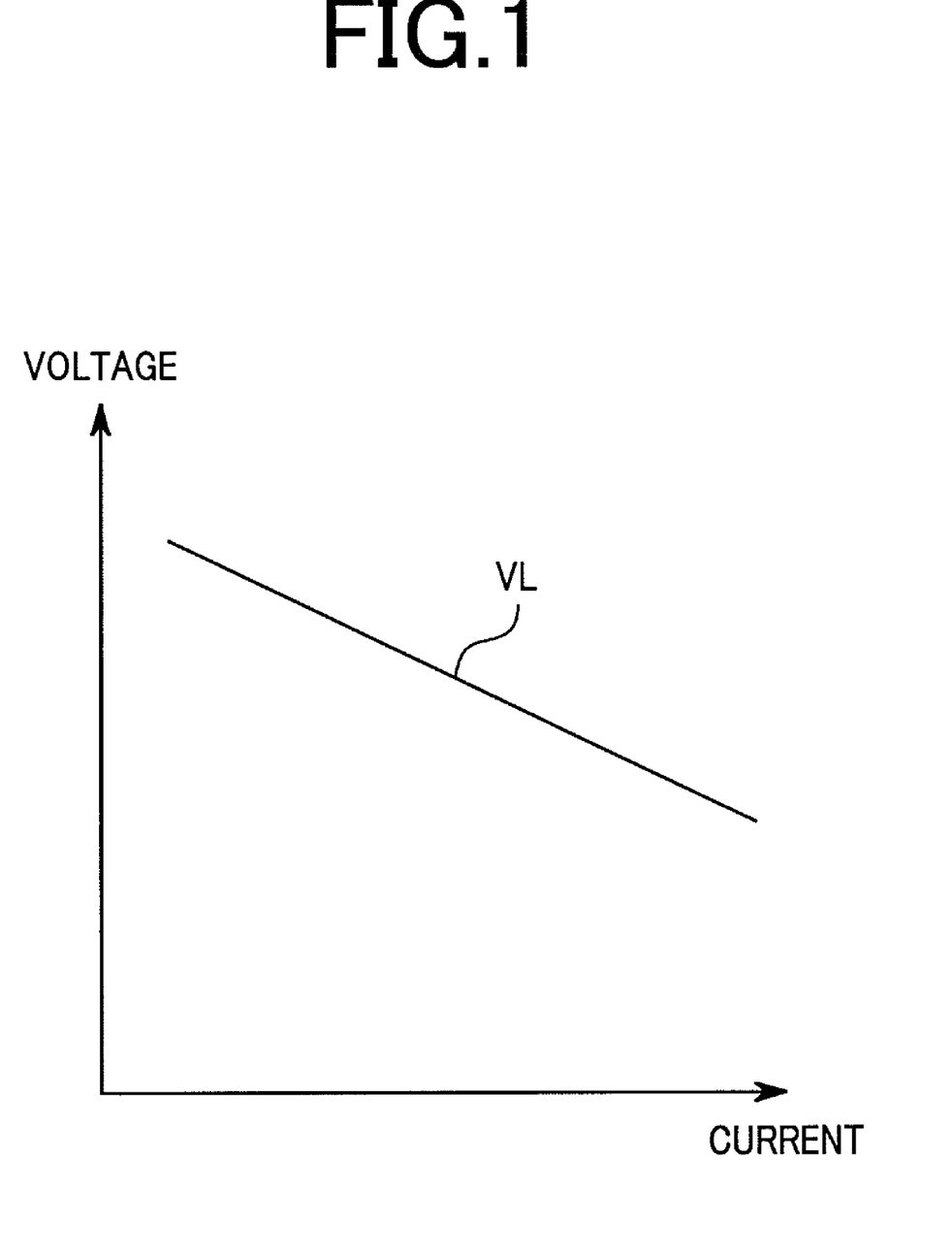
FIG. 1 is a view showing a current-voltage characteristic of an antenna when the antenna receives electromagnetic waves from a reader/writer.

FIG. 1 shows a current-voltage characteristic VL which is outputted from both terminals of an antenna which is provided to a non-contact type IC card, wherein the electric power is supplied to the non-contact type IC card from a reader/writer in a form of electromagnetic waves. The current-voltage characteristic VL indicates that voltages on both ends of the antenna are changed depending on a current which flows in a load connected to the antenna terminal and the voltages are equivalent to a voltage source Vo having an output resistance $R_o$. Here, a gradient of the above-mentioned current-voltage characteristic becomes the above-mentioned output resistance $R_o$.

Figure 2:
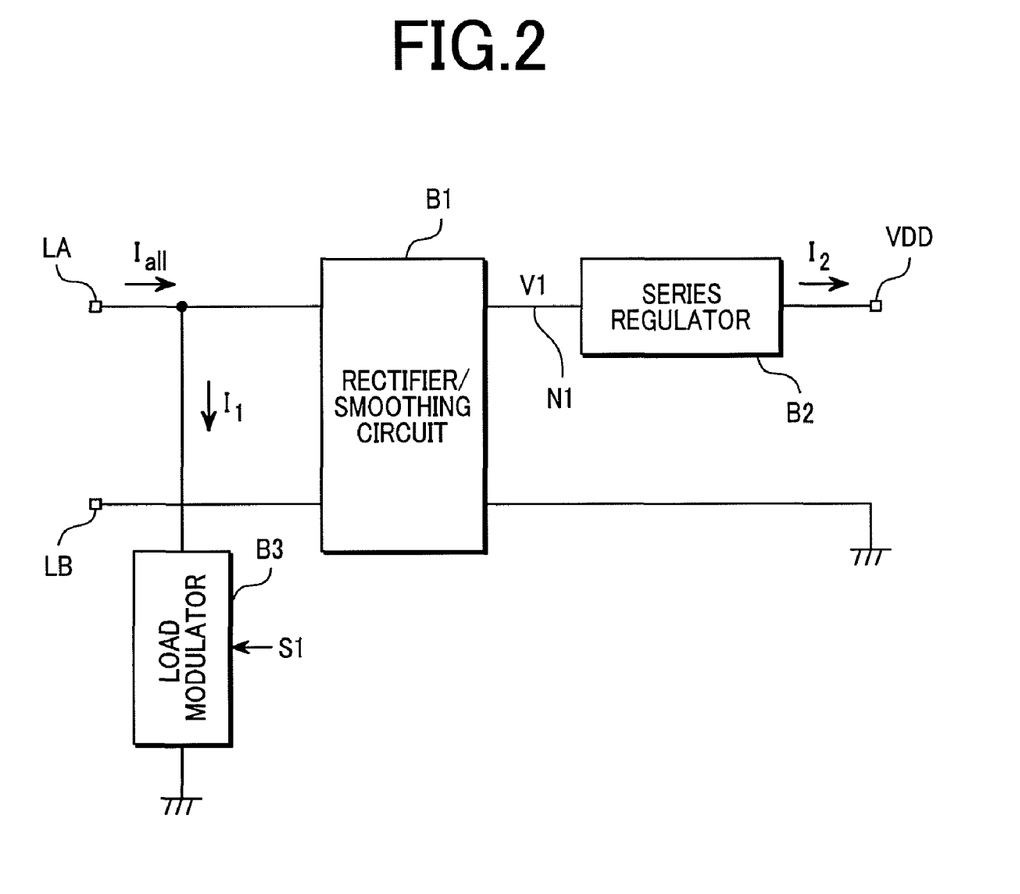
FIG. 2 is a constitutional view for explaining a power source circuit which is constituted of a rectifier/smoothing circuit and a series regulator and a load modulator.

FIG. 2 shows a rectifier/smoothing circuit B1, a series regulator B2 and a load modulator B3. The rectifier/smoothing circuit B1 is constituted of a rectifying circuit and a smoothing capacitor, and rectifies and smoothes a signal inputted to antenna terminals LA and LB, and outputs an output voltage V, between a connection point N1 and a ground terminal.

The series regulator B2 changes a voltage between a node N1 and an output terminal VDD such that a voltage of the output terminal VDD is fixed even when a load is fluctuated and a power source current is changed. In this case, by replacing a path between the node N1 and the output terminal VDD with a resistance, the resistance value is determined based on a current which flows in the path and a voltage between the node N1 and the output terminal VDD. That is, the series regulator B2 can be also referred to as a circuit which performs a control such that a voltage outputted to the output terminal VDD assumes a predetermined voltage by changing the equivalent resistance which is connected with the node N1 and the output terminal VDD in series. For example, when the output terminal VDD is going to exceed the predetermined voltage level, the resistance value of the equivalent resistance which is connected with the node N1 and the output terminal VDD in series is increased and hence, a potential difference between the node N1 and the output terminal VDD is increased. Accordingly, a feedback operation to lower the output voltage VDD is performed thus maintaining the voltage of the output terminal VDD at the predetermined voltage.

A load modulator B3 for allowing the transmission of data from the IC card to the reader/writer is connected between an antenna terminal LA and a ground terminal. The load modulator B3 allows the flow of an output current $I_1$ when the load modulator B3 is turned on in response to a control signal S1, while the load modulator B3 prevents the flow of an output current when the load modulator B3 is turned off. That is, the load modulator B3 generates a current change $\Delta I_1$ which flows in the load modulator B3 in response to the control signal S1.

In FIG. 2, a current change $\Delta I_{a111}$ of a current $I_{all}$ which flows in the antenna terminal LA between a case that the load modulator B3 is turned on and a case that the load modulator B3 is turned off is expressed by a following formula (1).

$$\Delta I_{a111} = \Delta I_1 \qquad (1)$$

This current imparts a change to electromagnetic waves which return to the reader/writer and the reader/writer receives data from the non-contact type IC card.

In the same manner, with respect to a current $I_2$ which flows in the output terminal VDD, when a current change $\Delta I_2$ which is irrelevant to the communication data is generated, a current change $\Delta I_{a112}$ of the current which flows in the antenna terminal is expressed by a following formula.

$$\Delta I_{a112} = \Delta I_2 \qquad (1)$$

Here, when the current change $\Delta I_{a112}$ is larger than a current change necessary for the reader/writer to receive, the reader/writer receives the current change $\Delta I_{a112}$ as data. However, this data is irrelevant to data which the non-contact type IC card transmits and hence, the reader/writer side eventually receives erroneous data. Accordingly, the operation is processed as a communication error on the reader/writer side.

Such a current change $\Delta I_2$ is generated, for example, in response to an operation of a control circuit which is represented by a CPU which is connected to the output terminal VDD or the like.

As described above, when the series regulator is applied, there has been a drawback that the current change attributed to the operation of the circuit which is mounted on the non-contact type IC card side is erroneously received and hence, an unnecessary communication is carried out between the reader/writer and the non-contact type IC card and, as a result, the communication quality is degraded.

Figure 3:
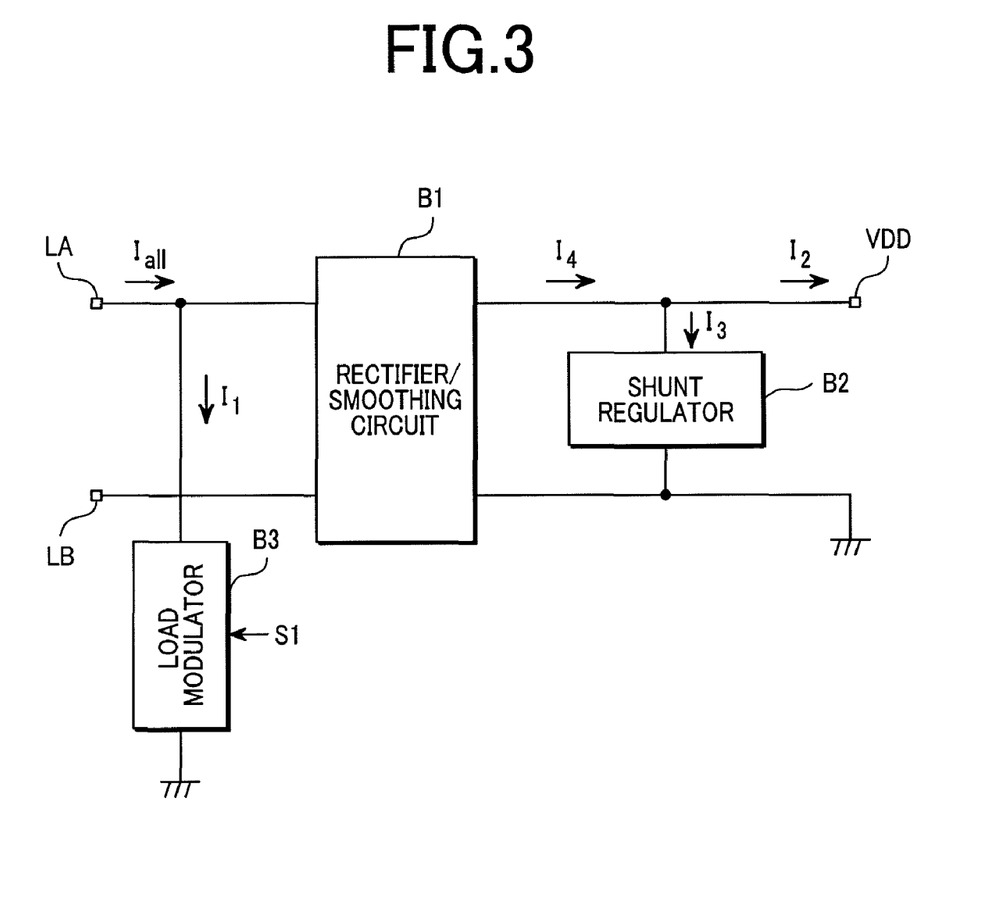
FIG. 3 is a constitutional view for explaining a power source circuit which is constituted of a rectifier/smoothing circuit and a shunt regulator and a load modulator.

FIG. 3 shows the rectifier/smoothing circuit B1, a shunt regulator B4 and the load modulator B3. The rectifier/smoothing circuit B1 is constituted of a rectifying circuit and a smoothing capacitor, rectifies and smoothes a signal inputted to the antenna terminals LA, LB and outputs an output voltage VDD between the output terminal VDD and a ground terminal.

The shunt regulator B4 performs a control such that a voltage outputted to the output terminal VDD assumes a predetermined voltage by changing a current which flows between the output terminal VDD and the ground terminal. For example, when the output terminal VDD is going to exceed a predetermined voltage level, a current $I_3$ which flows in the shunt regulator B4 is increased and hence, a current $I_{a11}$ which flows in the antenna terminal LA is increased along with the increase of the current $I_3$. As shown in FIG. 1, since the antenna is equivalent to a voltage source having an output resistance $R_o$, along with the increase of the above-mentioned current $I_{a11}$, a potential of the antenna terminal LA is lowered. Accordingly, a feedback operation is carried out to lower the output voltage VDD and hence, the output terminal VDD is maintained at a predetermined voltage.

Figure 4:
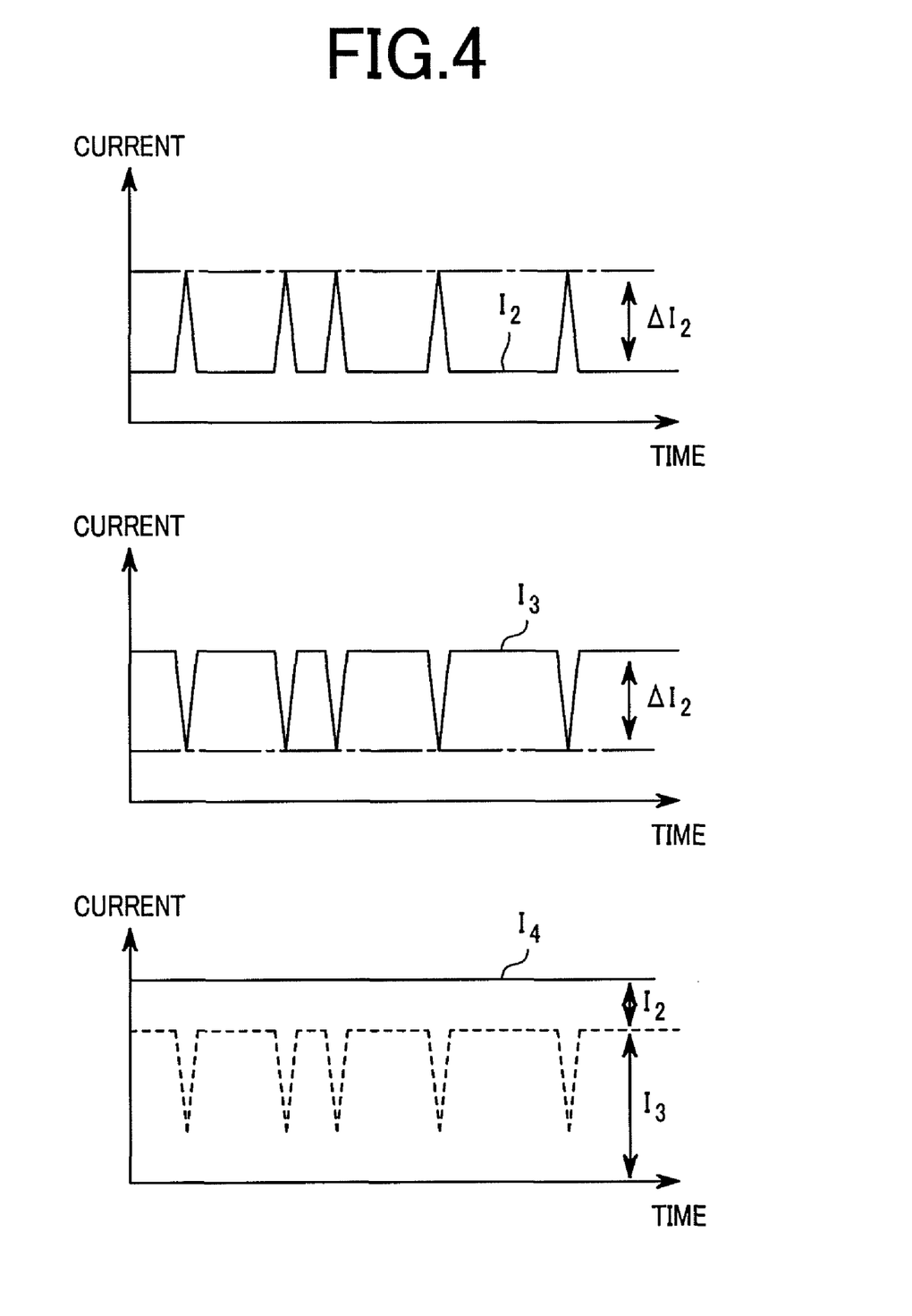
FIG. 4 is a view showing one example of operational waveforms of the power source circuit shown in FIG. 3.

FIG. 4 shows one example of respective current waveforms when a current change $\Delta I_{l2}$ of a current $I_{l2}$ which flows in the output terminal VDD is generated. In FIG. 4, symbol $I_2$ indicates the current which flows in the output terminal VDD, symbol $I_3$ indicates a current which flows in the shunt regulator B4, and symbol $I_4$ indicates a sum of the current $I_2$ which flows in the output terminal VDD and the current $I_3$ which flows in the shunt regulator B4.

When the current $I_2$ which flows in the output terminal VDD is increased by $\Delta I_2$, a feedback operation is performed by the shunt regulator B4 and, as a result, the current $I_3$ which flows in the shunt regulator B4 is decreased by $\Delta I_2$. To the contrary, when the current $I_3$ which flows in the output terminal VDD is decreased by $\Delta I_2$, due to a similar feedback operation, the current $I_3$ which flows in the shunt regulator B4 is increased by $\Delta I_2$.

As described above, the current change $\Delta I_2$ of the current $I_2$ which flows in the output terminal VDD and the current change of the current $I_3$ which flows in the shunt regulator B4 are offset with each other and hence, a current change of the current which flows in an output terminal of the rectifier/smoothing circuit B1 is eliminated whereby a current change of the current $I_{a11}$ which flows in the antenna terminal LA is also eliminated.

Here, an inner resistance between an input and an output of the rectifier/smoothing circuit B1, that is, the resistance between the antenna terminal LA and the output terminal VDD is extremely small in general. Accordingly, due to the operation of the shunt regulator B4, the current change on the input side in front of the rectifier/smoothing circuit B1 receives a control substantially equal to the current change on the output side.

That is, also with respect to the current change $\Delta I_1$ which the load modulator B3 generates in response to the control signal S1, this current change $\Delta I_1$ and the current change of the current $I_3$ which flows in the shunt regulator B4 are offset with each other and hence, the current change of the current $I_{all}$ which flows in the antenna terminal LA is eliminated.

As described above, when the shut regulator is applied, there has been a drawback that even when the load modulator B3 generates the current change $\Delta I_1$, the current change $\Delta I_1$ is offset by the current $I_3$ which flows in a voltage control current source B6 thus the current change of the whole non-contact type IC card is eliminated.

Accordingly, it is an object of the present invention to provide a semiconductor integrated circuit device which can perform a stable transmission via an antenna, and a non-contact type IC card and a portable information terminal using the semiconductor integrated circuit device. To briefly explain the invention disclosed in the present invention, they are as follows. That is, the semiconductor integrated circuit device includes: an antenna terminal which is connected to an antenna; a power source circuit which has a rectifier/smoothing circuit which obtains a DC voltage by rectifying and smoothing an AC signal which is supplied to the antenna terminal, and a shunt regulator and a series regulator which stabilize the DC voltage; and an internal circuit which is operated upon the supply of the DC voltage from the power source circuit, wherein the series regulator is operated during a period in which a signal is transmitted to a reader/writer, the shunt regulator is stopped, and while in periods except for the period in which the signal is transmitted to the reader/writer, the shunt regulator is operated and the series regulator is stopped.

BEST MODE FOR CARRYING OUT THE INVENTION

Hereinafter, a semiconductor integrated circuit device and a non-contact type IC card and a portable information terminal which use the semiconductor integrated circuit device of the present invention are further explained in detail in conjunction with several embodiments. Here, same symbols used in FIG. 5 to FIG. 13 indicate identical or similar parts.

Embodiment 1

Figure 5:
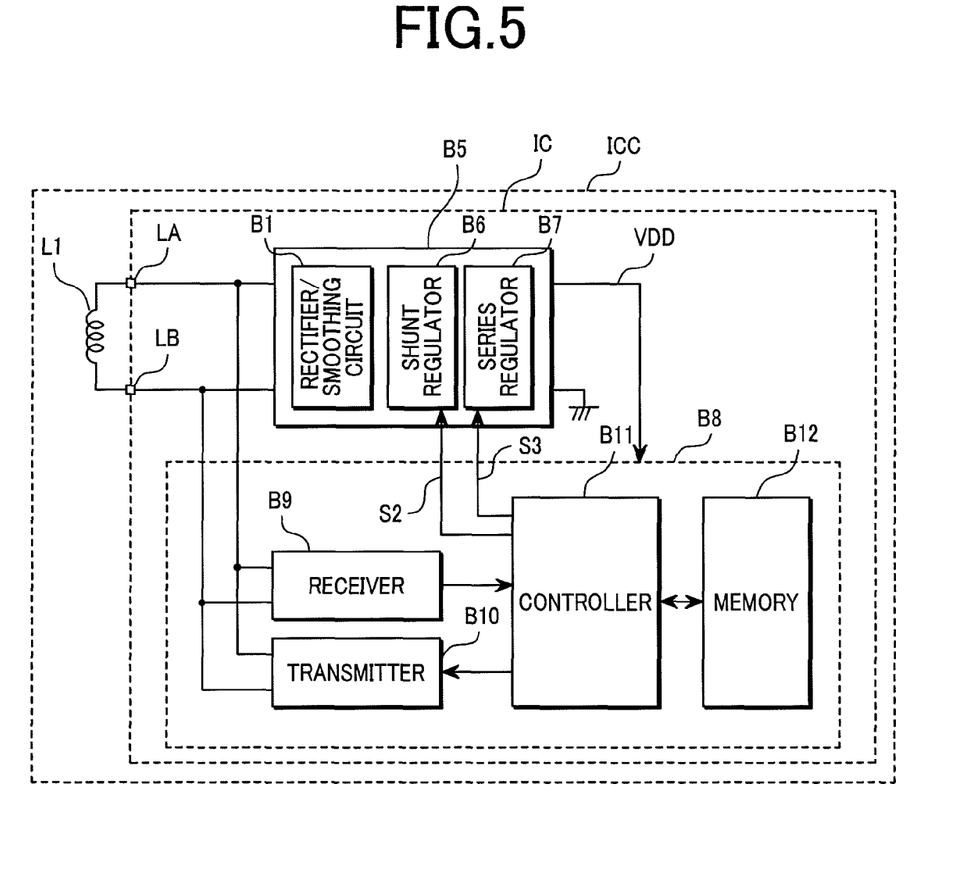
FIG. 5 is a constitutional view for explaining a first embodiment of a semiconductor integrated circuit device and a non-contact type IC card according to the present invention.

FIG. 5 shows the basic constitution of a first embodiment of a semiconductor integrated circuit device and a non-contact type IC card of the present invention. In FIG. 5, symbol ICC indicates the non-contact type IC card, symbols IC and L1 respectively indicate the semiconductor integrated circuit device and an antenna which are mounted on the non-contact type IC card ICC. The semiconductor integrated circuit device IC includes a power source circuit B5, an internal circuits B8 and antenna terminals LA, LB to which the antenna L1 is connected.

Figure 6:
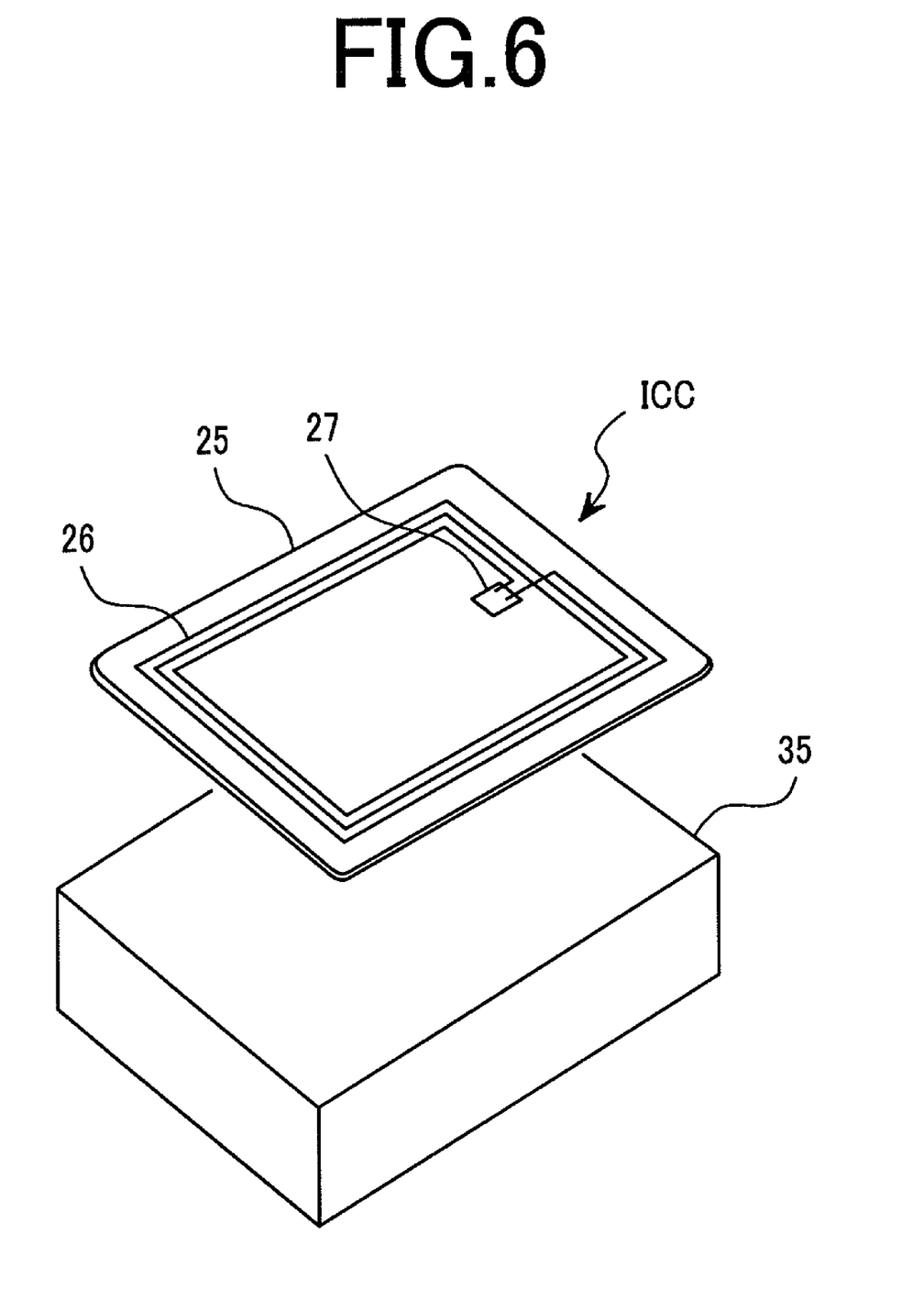
FIG. 6 is a bird-eye view for explaining the structure of the non-contact type IC card of the first embodiment.

FIG. 6 shows the structure of the IC card ICC. The IC card ICC is constituted of a printed wiring board 25 which is resin-molded and is formed in a card shape. The antenna L1 which receives electromagnetic waves from an external reader/writer 35 is constituted of a vortex coil 26 which is formed of a line of the printed wiring board 25. The semiconductor integrated circuit device IC is constituted of one IC chip 27 and is mounted on the printed wiring board 25. The coil 26 which constitutes the antenna L1 is connected to the IC chip 27.

The present invention is typically applicable to a non-contact type IC card which has no inputting and outputting terminals for the outside connection on the surface thereof. It is needless to say that the present invention is applicable to a dual type IC card which has inputting and outputting terminals with a non-contact interface. Although there is no particular limitation, the semiconductor integrated circuit device IC shown in the drawing is formed on one semiconductor substrate made of mono-crystalline silicon or the like by using a known manufacturing technique of the semiconductor integrated circuit device and constitutes the IC chip 27.

The antenna L1 which receives electromagnetic waves from the reader/writer 35 outputs an AC signal of high frequency to the antenna terminals LA, LB. The AC signal is partially modulated based on an information signal (data).

In FIG. 5, the power source circuit B5 is constituted of a rectifier/smoothing circuit B1, a shunt regulator B6 and a series regulator B7. The rectifier/smoothing circuit B1 rectifies and smoothes the AC signal received by the antenna L1. The shunt regulator B6 performs a control such that an output voltage of the rectifier/smoothing circuit B1 does not become a predetermined voltage level or more, and the series regulator B7 sets an output terminal VDD to a constant voltage. The shunt regulator B6 and the series regulator B7 control the above-mentioned voltage control operation based on control signals S2, S3 inputted from a controller B11.

The output power source voltage VDD of the power source circuit B5 is supplied to an internal circuit B8 as an operational power source voltage. The internal circuit B8 is constituted of a receiver B9, a transmitter B10, a controller B11 and a memory B12. The receiver B9 demodulates the AC signal which is received by the antenna L1 provided to the IC card ICC and is modulated by the information signal and supplies the obtained digital information signal to the controller B11. Further, the receiver B9 also has a function of generating a clock signal. The transmitter B10 receives the digital information signal which the controller B11 generates, and modulates the AC signal which the antenna N1 receives based on the information signal. On an output side of the transmitter B10, although not shown in FIG. 5, a load modulated circuit which performs the above-mentioned modulation is arranged. The reader/writer 35 receives the information signal from the controller B11 upon reception of the change of the reflection of the electromagnetic waves from the antenna L1 in response to the above-mentioned modulation.

Here, the transmission and the reception of signals which the IC card ICC performs with the reader/writer 35 is divided into a signal reception stage in which the IC card ICC receives data by receiving the modulated electromagnetic waves from the reader/writer 35, an inner processing stage in which the IC card ICC performs inner processing such as the generation of data upon receiving non-modulated electromagnetic waves, and a transmission stage in which the IC card ICC transmits the generated data to the reader/writer 35. In this specification, the reception stage and the inner processing stage are collectively referred to as "stage other than transmission stage"

Figure 7:
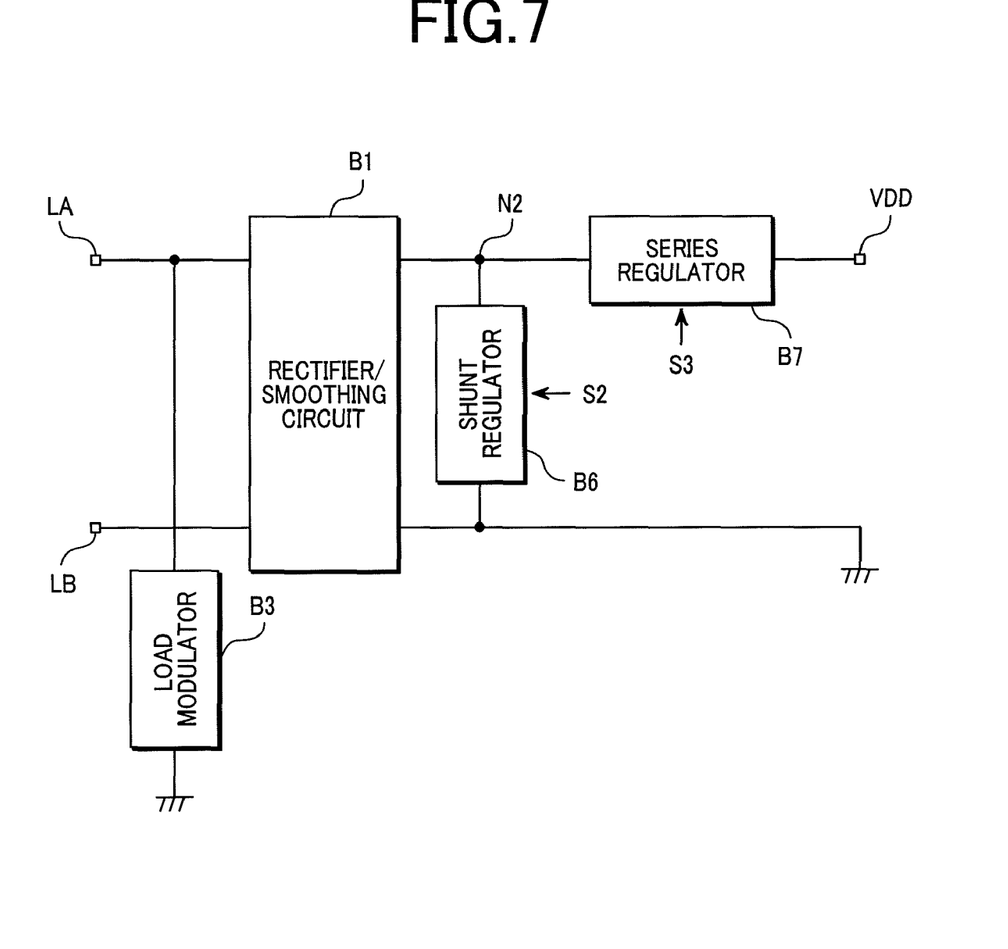
FIG. 7 is a circuit diagram for explaining a power source circuit which is mounted in the first embodiment.

FIG. 7 shows the basic circuit constitution of the power source circuit B8. In FIG. 7, the rectifier/smoothing circuit B1 is connected to the antenna terminals LA, LB, the shunt regulator B6 is connected to a node N2 which is connected to an output terminal of the rectifier/smoothing circuit B1, and the series regulator B7 is connected between the node N2 and the output voltage terminal VDD. Further, in FIG. 7, the load modulator B3 is connected between the antenna terminal LA and a ground.

The rectifier/smoothing circuit B1 is constituted of a rectifying circuit and a smoothing capacitor, rectifies and smoothes the AC signal inputted to the antenna terminals LA, LB, and obtains an output voltage V2 between the node N2 and a ground terminal.

The shunt regulator B6 controls a possibility of an operation to set the voltage to a constant voltage in response to a control signal S2. The shunt regulator B6 is allowed to be operated in the stage other than the transmission stage. Here, the output voltage V2 is controlled such that a voltage level outputted to the node N2 does not become a predetermined voltage or more by changing a current which flows between the node N2 and the ground terminal. The shunt regulator B6 is not allowed to be operated in the signal transmission stage and the above-mentioned operation to set the voltage to the constant voltage is stopped in the signal transmission stage.

The series regulator B7 performs a control of a possibility of the operation to set the voltage to the constant voltage in response to a control signal S3. The series regulator B7 is allowed to be operated in the transmission stage. Here, the series regulator B7 performs a control such that a voltage level outputted to the output terminal VDD does not become a predetermined voltage or more by changing a resistance which is connected in series with the node N2 and the output terminal VDD. The series regulator B7 is not allowed to be operated in the stage other than the signal transmission stage and the above-mentioned operation to set the voltage to the constant voltage is stopped in the stage other than the signal transmission stage.

In FIG. 7, when the data is transmitted to the reader/writer by turning on and off the load modulator B3, the operation of the shunt regulator B6 is inhibited and the operation of the series regulator B7 is allowed thus preventing an offset of the current change by the load modulator B3. To the contrary, when the data transmission by the load modulator B3 is not performed, that is, when the load modulator B3 stops the ON/OFF operation, it is possible to prevent the transmission of the current change in the inside of the IC card ICC to the reader/writer by allowing the operation of the shunt regulator B6. Here, the possibility of the operation of the series regulator B7 may be determined based on the circuit constitution, a detected voltage level of the series regulator, a detected voltage level of the shunt regulator B6 or the like.

Due to the above-mentioned operations, it is possible to make use of an advantage of the current change transmission characteristic of the series regulator which can easily transmit the current change in the inside of the IC card to the reader/writer and an advantage of the current change transmission characteristic of the shunt regulator which offsets the current change in the inside of the IC card.

Figure 8:
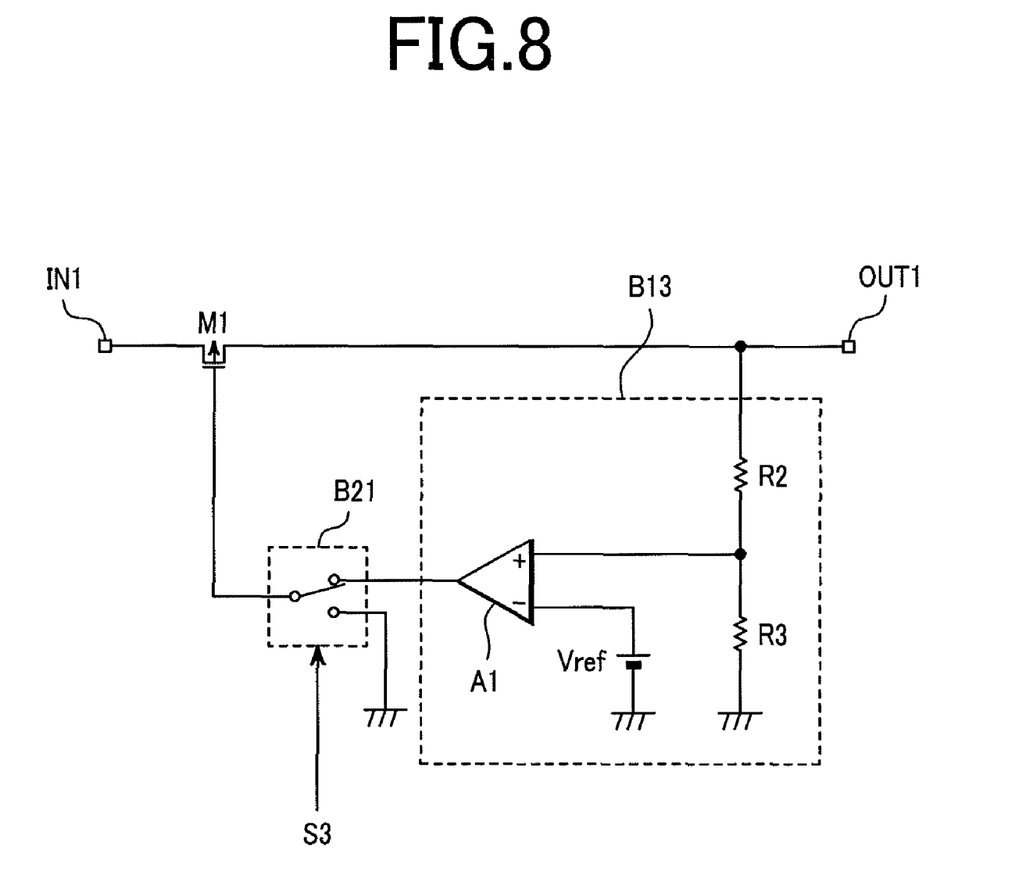
FIG. 8 is a circuit diagram for explaining a series regulator which the power source circuit shown in FIG. 7 includes.

FIG. 8 shows the example of the series regulator B7. The series regulator B7 is constituted of a voltage detection circuit B13 which forms a detection voltage corresponding to a change of the voltage level of the power source voltage VDD, a MOS transistor M1 which changes an equivalent resistance component between an input terminal IN1 and an output terminal OUT1 in accordance with the detection voltage of the voltage detection circuit B13, and a switching circuit B21. The voltage detection circuit B13 is constituted of a following circuit. Between an output terminal OUT1 which constitutes the power source terminal VDD and a ground terminal, voltage dividing resistances R2, R3 are provided. A divided voltage which is obtained at a node between the voltage dividing resistances R2, R3 is supplied to a non-inverting input (+) of an operational amplifier circuit A1. A reference voltage source Vref is provided between an inverting input terminal (−) of the operational amplifier circuit A1 and the ground terminal. An output voltage of the operational amplifier circuit A1 corresponding to the difference between the divided voltage and the reference voltage source Vref is applied to a gate of the MOS transistor M1 via the switching circuit 21 so as to change the equivalent resistance component of the MOS transistor M1. The switching circuit 21 is controlled in response to the control signal S3, wherein when the operation of the series regulator B7 is allowed, the gate of the MOS transistor M1 is connected to the operational amplifier circuit A1, while when the operation of the series regulator B7 is not allowed, that is, when the operation to set the voltage to the constant voltage is stopped, the gate of the MOS transistor M1 is grounded. The MOS transistor M1 which has the gate thereof grounded assumes a substantially short-circuiting state and possesses the low resistance. Here, a fixed voltage may be applied to the above-mentioned gate to stop the operation to set the voltage to the constant voltage.

Figure 9:
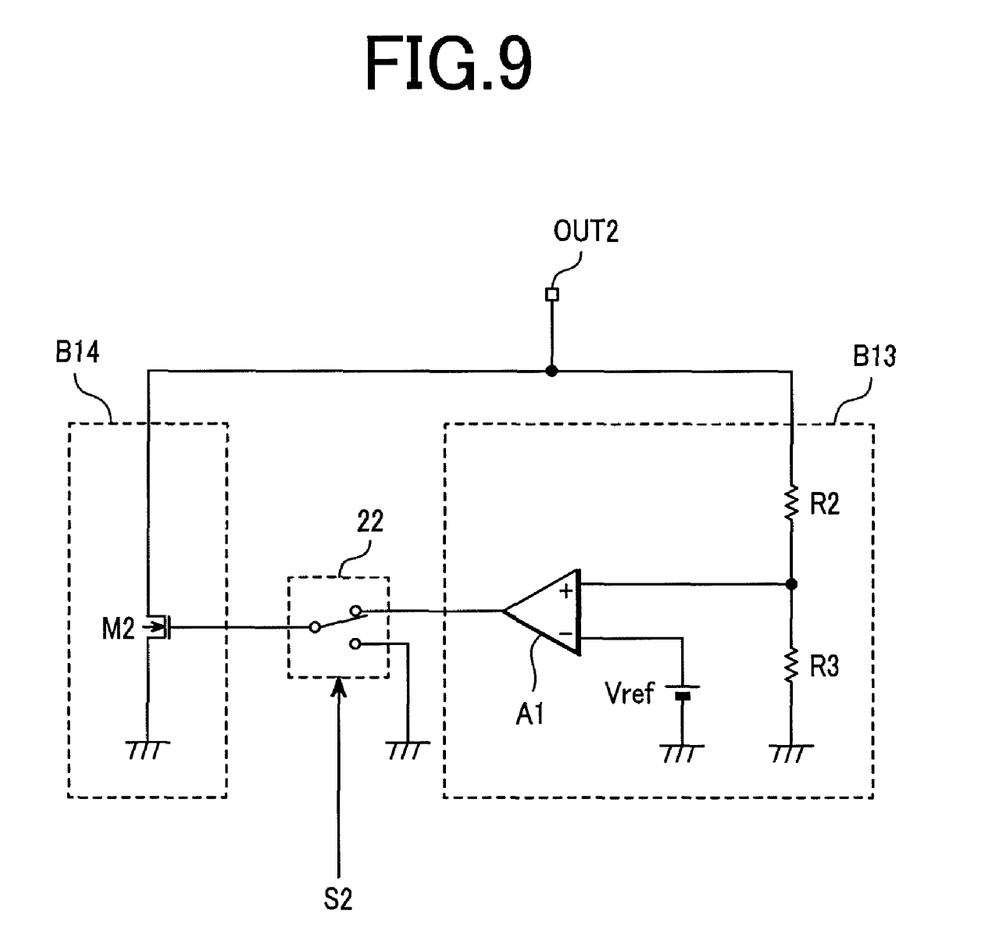
FIG. 9 is a circuit diagram for explaining the shunt regulator which the power source circuit shown in FIG. 7 includes.

FIG. 9 shows one example of the shunt regulator B6. The shunt regulator B6 is constituted of a voltage detection circuit B13 which forms a detection voltage corresponding to a change of a voltage level of an output terminal OUT2, a voltage control current source B14 which flows an electric current in accordance with a detection voltage of the voltage detection circuit B13, and the switching circuit 22. The voltage detection circuit B13 is substantially equal to the voltage detection circuit B13 in FIG. 8 and hence, the explanation of the voltage detection circuit B13 is omitted. The voltage control current source B14 may be constituted of a MOS transistor M2 in a compact mode. To a gate of the MOS transistor M2, an output voltage of an operational amplifier circuit A1 corresponding to the difference between a divided voltage and a reference voltage source Vref is supplied via the switching circuit 22. The MOS transistor M2 changes an electric current which flows in the MOS transistor M2 per se in response to an output voltage of the operational amplifier circuit A1. The switching circuit 22 is controlled in response to the control signal S2, wherein when an operation of the series regulator B7 is allowed, the gate of the MOS transistor M2 is connected to the operational amplifier circuit A1, while when the operation of the series regulator B7 is not allowed, that is, when an operation to set the voltage to a constant voltage is stopped, the gate of the MOS transistor M2 is grounded. The MOS transistor M2 which has the gate thereof grounded assumes an open state and hence, an electric current does not flow. Here, to stop the operation to set the voltage to the constant voltage, a fixed voltage may be supplied to the gate.

As described above, according to this embodiment, by stopping the operation of the shunt regulator B6 in the signal transmission stage in which the load modulator B3 is operated, in the communication from the non-contact type IC card to the reader/writer, it is possible to perform the stable data transmission.

Here, as a modification of the shunt regulator B6, in a more simplified mode, the shunt regulator B6 may be replaced with a Zener diode. In this case, there is no connection of the voltage detection circuit B13 and hence, a rectifying voltage is limited by a Zener voltage which the Zener diode possesses. The allowance and the non-allowance of the operation of the Zener diode are performed by turning on or off a switch which is connected with the Zener diode in series.

Further, in the above-mentioned constitution, the antenna L1 is formed on the printed wiring board 25 of the IC card ICC. However, it is possible to further miniaturize the antenna in a coil shape and to form the antenna on an IC chip which is constituted as a semiconductor integrated circuit device. The IC chip which forms the antenna in the above-mentioned manner also functions as an IC tag.

Further, although both antennas are formed in a coil shape in the above-mentioned constitution, apart form such a constitution, the antennas may be constituted of a thin elongated strip-like metal pattern which is formed on a small paper piece or the like, for example, and the antenna terminals LA, LB of the semiconductor integrated circuit device IC are connected to the metal pattern thus constituting an electronic device which becomes a responder.

Embodiment 2

Figure 10:
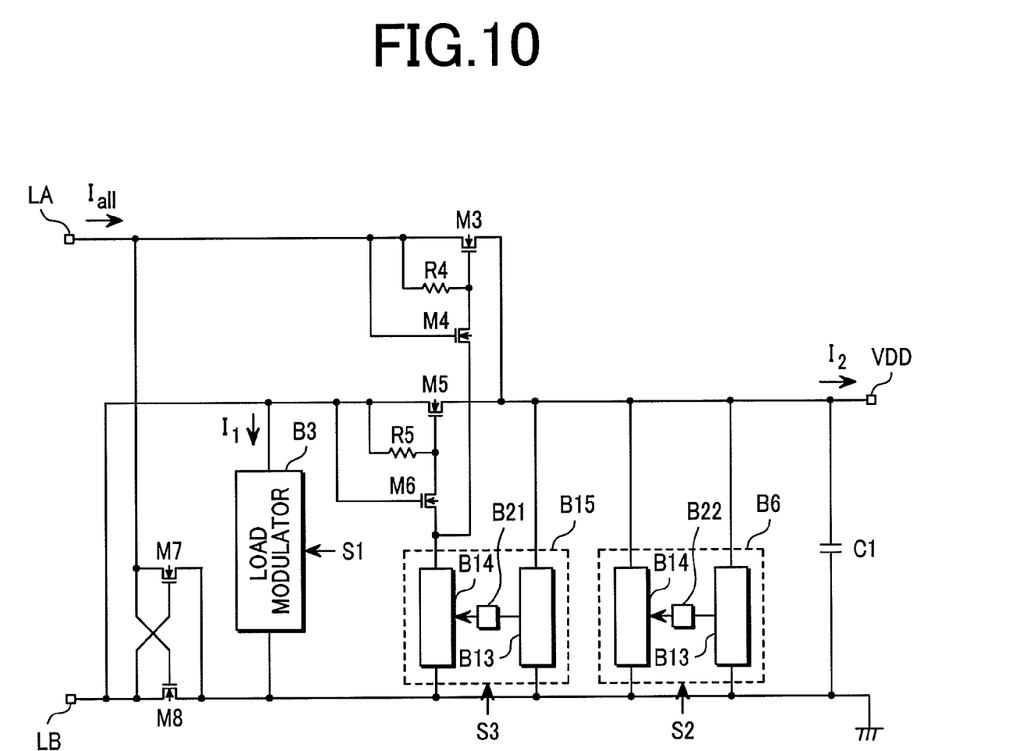
FIG. 10 is a circuit diagram for explaining a power source circuit which is mounted in a second embodiment.

FIG. 10 shows a second embodiment in which the rectification and the voltage control by the series regulator in the power source circuit shown in FIG. 7 are performed using one transistor. In FIG. 10, the power source circuit includes antenna terminals LA, LB to which an antenna provided to an IC card ICC is connected. Further, the power source circuit includes MOS transistors M3, M4, M5, M6, M7, M8, resistances R4, R5, a smoothing capacitor C1, and a series regulator control circuit B15 thus constituting a power source circuit disclosed in the above-mentioned Japanese Patent Laid-open No. 2001-274339, In the power source circuit of this embodiment, a shunt regulator B6 is further connected to the above-mentioned circuit constitution. When an AC voltage of the antenna terminal LA assumes a positive voltage, the MOS transistor M8 is turned on and the MOS transistor M7 is turned off and hence, a positive AC voltage is supplied to the MOS transistor M3 and the antenna terminal LB is grounded. When the AC voltage of the antenna terminal LA assumes a negative voltage, the MOS transistor M7 is turned on and the MOS transistor M8 is turned off and hence, a positive AC voltage is supplied to the MOS transistor M5 and the antenna terminal LA is grounded. In the MOS transistors M3 and M5, an electric current flows only in one direction from the respective antenna terminals LA, LB to a power source terminal VDD and, at the same time, the electric current is controlled in response to voltages supplied to the respective gates. That is, both transistors perform two operations consisting of the rectification and the voltage control of the series regulator.

A series regulator control circuit B15 is constituted of a voltage detection circuit B13, a voltage control current source B14, and a switching circuit B21, wherein the possibility of the operation is controlled in response to a control signal S3. An output current of the control current circuit B15 is made to flow in resistances R4, R5 via the MOS transistors M4, M6 thus generating control voltages which are supplied to gates of the MOS transistors M3, M5 respectively.

The shunt regulator B6 is constituted of a voltage detection circuit B13, a voltage control current circuit B14, and a switching circuit 22, wherein a possibility of operation is controlled in response to a control signal S2.

Further, between the antenna terminal LB and a ground terminal, a load modulator B3 which is controlled in response to a control signal S1 is connected.

In a signal transmission state in which the operation of the series regulator control circuit B15 is allowed and the operation of the shunt regulator B6 is inhibited, to calculate a current change $\Delta I_{a113}$ of an electric current $I_{a11}$ which flows in the antenna terminal LA attributed to a current change $\Delta I_1$ of an electric current I1 which flows in a load modulator 3, the current change $\Delta I_{a113}$ is obtained by a following formula (1) Here, it is assumed that resistance values of the resistances R4, R5 are set equal to each other.

$$\Delta I_{a113} = \Delta I_1 \times R4/(R4+R_o) \quad (1)$$

In a state other than the signal transmission state in which the operation of the series regulator control circuit B15 is inhibited and the operation of the shunt regulator B6 is allowed, to calculate a current change $\Delta I_{a114}$ of an electric current $I_{a11}$ which flows in the antenna terminal attributed to a current change $\Delta I_2$ of an electric current $I_2$ which flows in the output terminal VDD, the current change $\Delta I_{a114}$ is obtained by a following formula (2).

$$\Delta I_{a114} = 0 \quad (2)$$

In FIG. 10, when data is transmitted to a reader/writer by turning on and off the load modulator B3, by inhibiting the operation of the shunt regulator B6 and by allowing the operation of the series regulator control circuit B15, it is possible to prevent an offset of the current change attributed to the load modulator B3. To the contrary, when the transmission of data attributed to the load modulator B3 is not performed, by allowing the operation of the shunt regulator B6 and by inhibiting the operation of the series regulator control circuit B15, it is possible to prevent the transmission of the current change in the inside of the IC card to the reader/writer.

In this manner, it is unnecessary to provide the rectifying and the smoothing circuit and the series regulator separately and hence, it is possible to apply the rectifying and the smoothing circuit having a function of the series regulator described in the above-mentioned Japanese Patent Laid-open No. 2001-274339 to the present invention.

Embodiment 3

Figure 11:
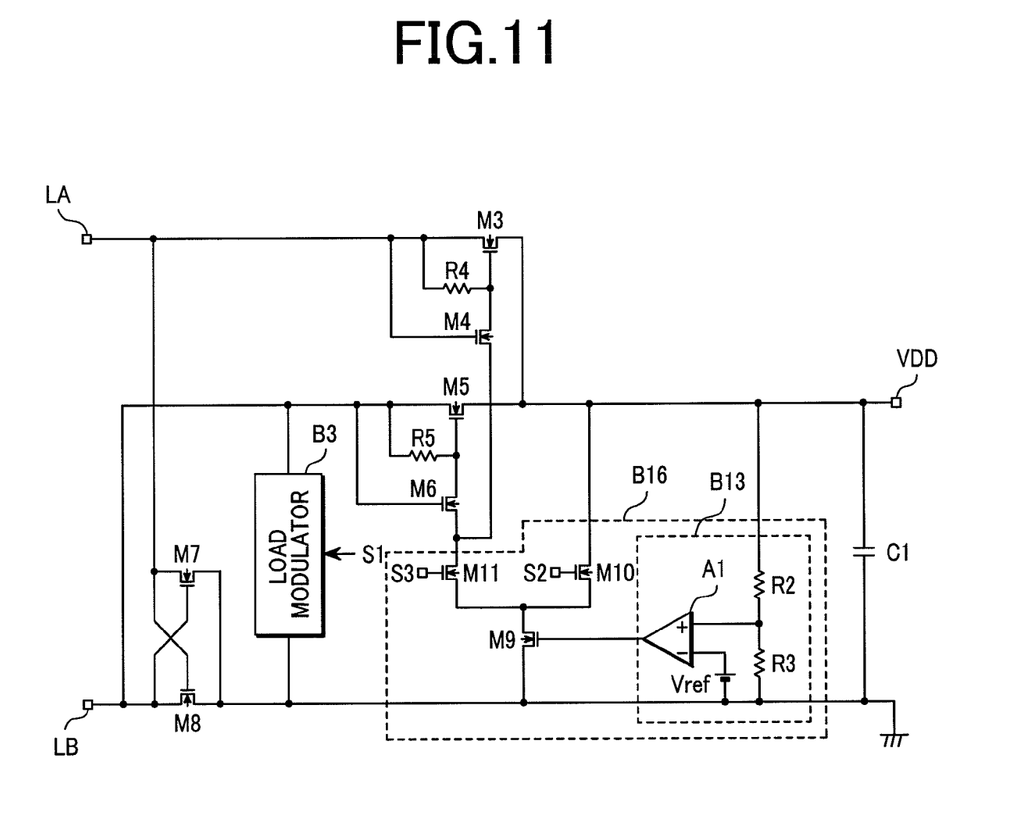
FIG. 11 is a circuit diagram for explaining a power source circuit which is mounted in a third embodiment.

FIG. 11 shows a third embodiment which allows a shunt regulator and a series regulator control circuit to use a voltage detection circuit in common in the power source circuit shown in FIG. 10.

In FIG. 11, a regulator type control circuit B16 has a function of the series regulator control circuit B15 in FIG. 10 and a function of the shunt regulator B6 in FIG. 10. In the regulator method control circuit B16, a voltage detection circuit B13 which the series regulator control circuit B15 in FIG. 10 includes and the voltage detection circuit B13 which the shunt regulator B6 in FIG. 10 includes are used in common. Further, in the regulator method control circuit B16, the voltage control current source B14 which the series regulator control circuit B15 shown in FIG. 10 includes and the voltage control current source B14 which the shunt regulator B6 shown in FIG. 10 includes are used in common and is replaced with a MOS transistor M9.

A MOS transistor M10 has ON/OFF operations thereof controlled in response to a control signal S2 and is operated as a switch. A MOS transistor M11 has ON/OFF operations thereof controlled in response to a control signal S3 and is operated as a switch. Accordingly, when the MOS transistor M10 is turned on an the MOS transistor M11 is turned off (state other than signal transmission state), an electric current which flows in the MOS transistor M9 flows in a power source terminal VDD and the operation of the shunt regulator is performed. To the contrary, when the MOS transistor M10 is turned off and the MOS transistor M11 is turned on (signal transmission state), the current which flows in the MOS transistor M9 flows in resistances R4, R5 and hence, the operation of the series regulator is performed. Accordingly, it is possible to realize functions substantially equal to functions described in FIG. 10 by simplifying the constitution.

Embodiment 4

Figure 12:
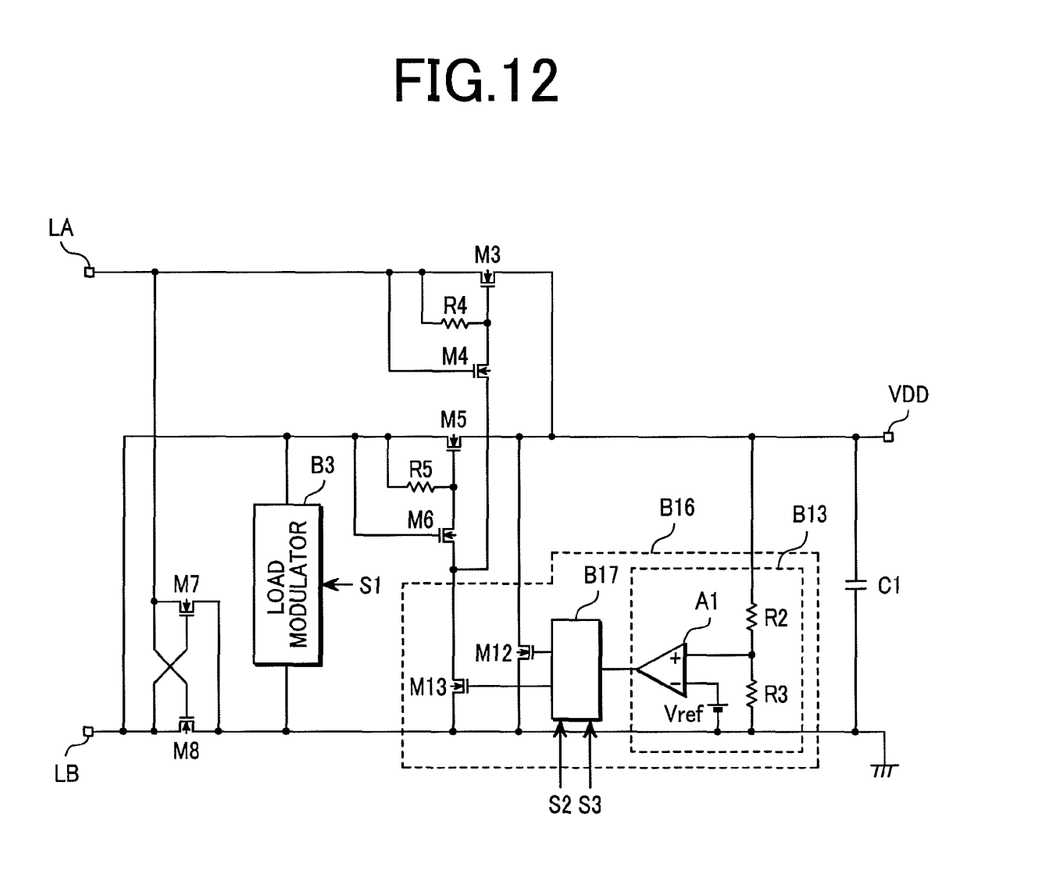
FIG. 12 is a circuit diagram for explaining a power source circuit which is mounted in a fourth embodiment of the present invention.

FIG. 12 shows a fourth embodiment which allows the shunt regulator and the series regulator control circuit to use the voltage detection circuit in common in the power source circuit shown in FIG. 10.

In the same manner as the circuit constitution in FIG. 11, also in the circuit constitution in FIG. 12, a regulator method control circuit B16 has a function of the series regulator control circuit B15 in FIG. 10 and a function of the shunt regulator B7 in FIG. 10. In the regulator method control circuit B16, a voltage detection circuit B13 which the series regulator control circuit B15 in FIG. 10 includes and the voltage detection circuit B13 which the shunt regulator B6 in FIG. 10 includes are used in common.

Further, the regulator type control circuit B16 includes a MOS transistor M13 which is operated as the voltage control current source B14 which the series regulator control circuit B15 in FIG. 10 includes, and a MOS transistor M12 which is operated as a voltage control current source B14 which the shunt regulator B7 in FIG. 10 includes. Further, the regulator method control circuit B16 includes a selection circuit B17 which selects the MOS transistor to which a detection voltage of the voltage detection circuit B13 is supplied out of the MOS transistors M12, M13.

The selection circuit B17, when an operation of the shunt regulator B7 is allowed in response to a given control signal S2 (state other than signal transmission state), supplies an output voltage of an operational amplifier circuit A1 to a gate of the MOS transistor M12, and when the operation of the shunt regulator B7 is not allowed (signal transmission state), connects the gate of the MOS transistor M12 to a ground. Further, the selection circuit B17, when an operation of the MOS transistor M13 of a series regulator control circuit system is allowed in response to a given control signal S3 (signal transmission state), supplies an output voltage of an operational amplifier circuit A1 to a gate of the MOS transistor M13, and when the operation of the MOS transistor M13 is not allowed (state other than signal transmission state), connects the gate of the MOS transistor M13 to aground. In this manner, the selection circuit B17 allows the operation of either one of the MOS transistors M12, M13.

Accordingly, the regulator method control circuit B16, when the selection circuit B17 supplies the detection voltage of the voltage detection circuit B13 to the MOS transistor M12, is operated as the shunt regulator, while when the selection circuit B17 supplies the detection voltage of the voltage detection circuit B13 to the MOS transistor M13, is operated as a series regulator control circuit. Accordingly, the regulator method control circuit B16 can realize functions substantially equal to the functions of the circuit constitution shown in FIG. 10.

In FIG. 11, it is necessary to make a large current flow in the MOS transistors M9, M10, M11 and hence, it is necessary to increase a gate width of the MOS transistor whereby a use area of the MOS transistor on a chip is large. However, in FIG.

12, it is necessary to make the large current flow only in the MOS transistors M12, M13. Accordingly, compared to the case shown in FIG. 11, it is possible to decrease the use area of the MOS transistor on the chip.

Embodiment 5

Figure 13:
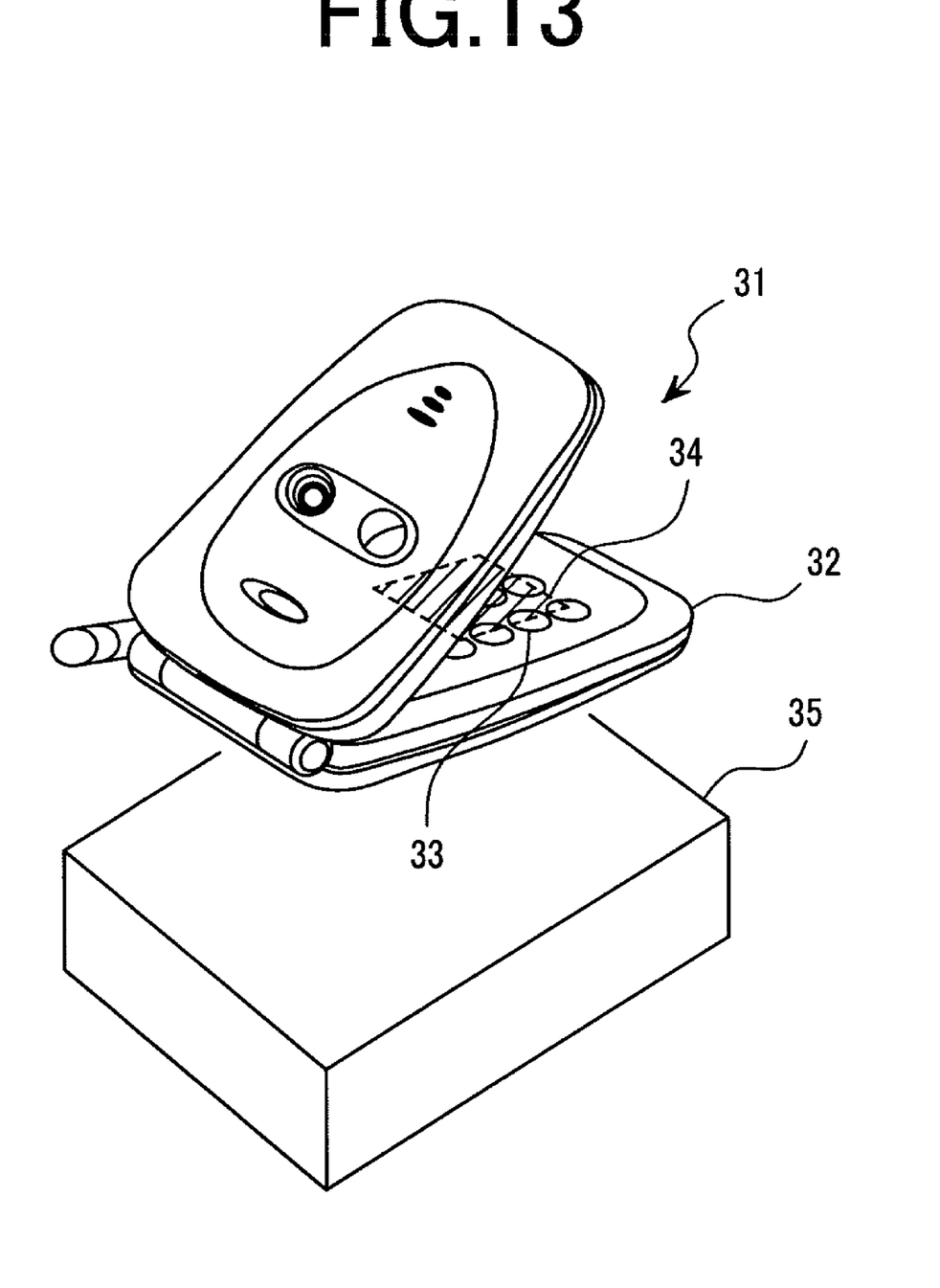
FIG. 13 is a bird-eye view of mobile phone for explaining a fifth embodiment of the present invention.

FIG. 13 shows a fifth embodiment of a portable information terminal of the present invention in which any one of the non-contact type IC cards of the embodiment 1 to embodiment 4 is incorporated. In FIG. 13, numeral 31 indicates a mobile phone which constitutes the portable information terminal, numeral 32 indicates a foldable housing of the mobile phone 30, numeral 33 indicates an input device which is formed on inner surface of a body of the housing 32 and inputs data, and numeral 34 indicates a non-contact type IC card which is arranged in the inside of the housing 32 and on a back surface side of the input device 33. Although not shown in FIG. 13, a display device is arranged on the inner surface of a lid of the housing 32. Further, a transmission/reception circuit and a data processing circuit which perform transmission based on voices or data are arranged on respective portions of the lid of the housing 32. Data which is inputted into or outputted from the data processing circuit is displayed on the above-mentioned display device.

The IC card 34 includes a terminal which outputs data and a terminal to which a power source voltage is inputted, wherein the IC card 34 is connected with the data processing circuit via these terminals. Data of the inner circuit of the IC card 34 is displayed on the above-mentioned display device due to the manipulation of the input device 33.

Further, when the IC card 34 is placed in the vicinity of the reader/writer 35, irrespective of the presence or the non-presence of the supply of the power source to the mobile phone 31, the IC card 34 performs the transmission/reception signal with the reader/writer 35. Here, the IC card 34 may be detachably mounted on the mobile phone 31.

According to this embodiment, it is possible to know the data which the IC card 34 possesses without arranging the reader/writer therebetween and hence, the availability of the IC card 34 can be enhanced.

Here, in this embodiment, the IC card 34 is incorporated in the mobile phone 31. However, the IC card 34 may be incorporated in other portable information terminals in general including a handbook type personal computer, a notebook type personal computer and the like.

Although the invention which has been made by inventors of the present invention has been explained specifically in conjunction with the embodiments, it is needless to say that the present invention is not limited to the above-mentioned embodiments and various modifications are conceivable without departing from the gist of the present invention. For example, the control signal which controls the possibility of the operation of the shunt regulator and the control signal which controls the possibility of the operation of the series regulator may be realized by one control signal.

Further, in the non-contact type IC card shown in FIG. 5, the power source circuit, the receiver, the transmitter, the controller and the memory may be constituted of plural semiconductor integrated circuit devices. The present invention may be widely applicable to the semiconductor integrated circuit device and the non-contact type IC card which generate the internal power source voltage by rectifying and smoothing the AC voltage.

According to one mode for carrying out the present invention, in the power source circuit which includes the series regulator and the shunt regulator, the operation of the shunt regulator is stopped in the signal transmission state and hence, it is possible to perform the stable transmission of data to the reader/writer from the non-contact type IC card.

INDUSTRIAL APPLICABILITY

The present invention is preferably applicable to the IC card or the like and is widely available in transportation, finance, carriage, commerce and the like.

What we claim is:

1. A semiconductor integrated circuit device comprising:
an antenna terminal having two terminals for allowing inputting of an AC signal from an antenna;
a rectifier/smoothing circuit which outputs a power source voltage by rectifying and smoothing an AC signal which is inputted to the antenna terminal;
a regulator which stabilizes the power source voltage and outputs the stabilized power source voltage to a power source terminal; and
an internal circuit which includes a load modulator which is connected between one terminal of the antenna terminal and a ground terminal,
wherein the regulator controls a voltage between the rectifier/smoothing circuit and the power source terminal when the load modulator is operated, and controls a current which flows between the power source terminal and the ground terminal when the load modulator is stopped.

2. A semiconductor integrated circuit device according to claim 1, wherein the semiconductor integrated circuit device further includes the antenna which is formed of a coil.

* * * * *